Figure 1:
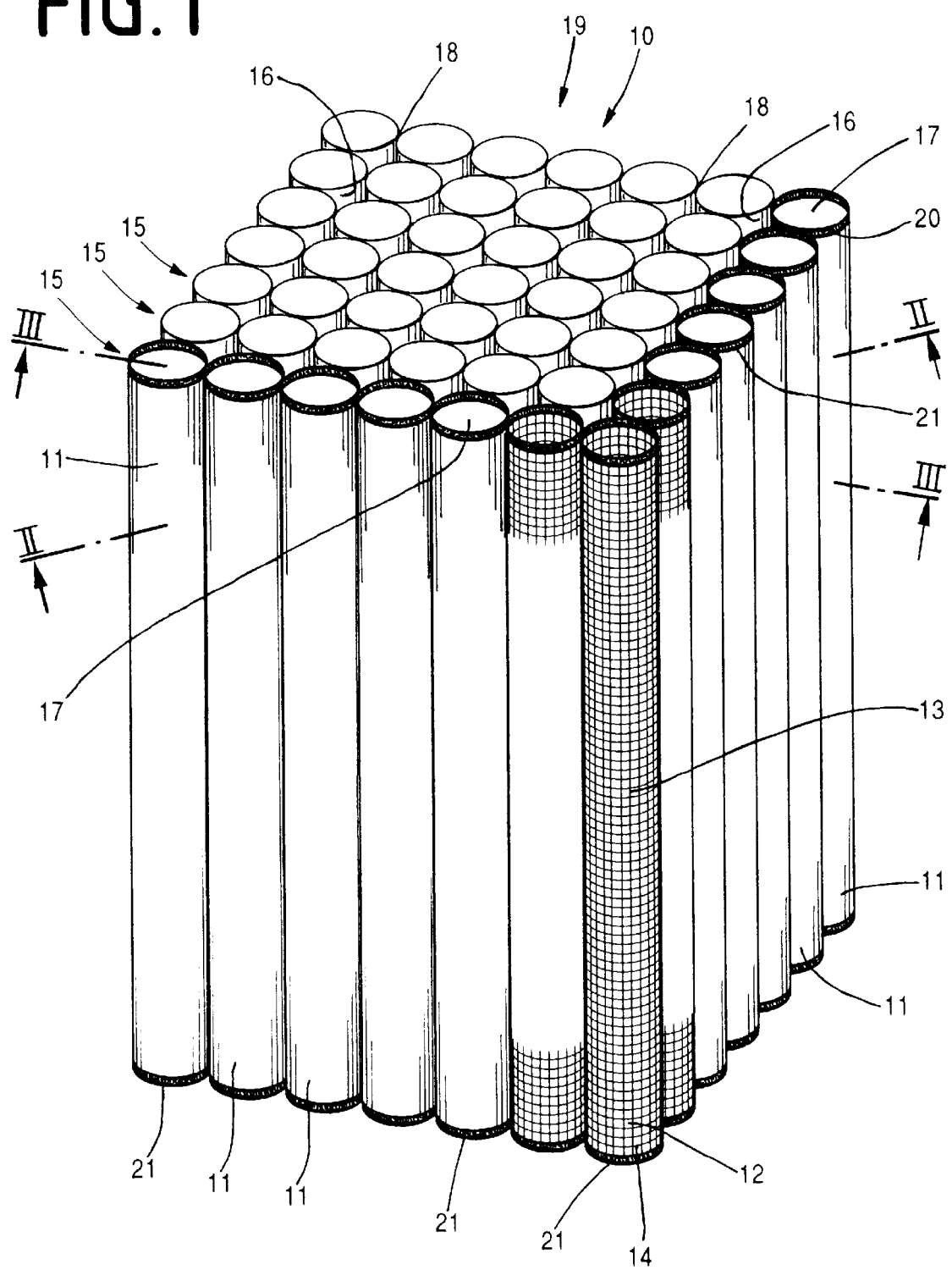

US005772870A

United States Patent [19]

Basse

[11] Patent Number: 5,772,870
[45] Date of Patent: Jun. 30, 1998

[54] TOWER PACKING BLOCK AND METHOD FOR MANUFACTURING THE SAME

[75] Inventor: Hartwig Basse, Nordenham, Germany

[73] Assignee: Norddeutsche Seekabelwerke GmbH, Germany

[21] Appl. No.: 659,404

[22] Filed: Jun. 6, 1996

[30] Foreign Application Priority Data

Jun. 7, 1995 [DE] Germany .................. 195 20 351.8

[51] Int. Cl.$^6$ ............................................. B01D 35/00
[52] U.S. Cl. ................ 210/150; 210/615; 261/DIG. 72; 156/196; 156/218
[58] Field of Search ............................. 261/94, 100, 101, 261/DIG. 72; 264/80, 512, DIG. 48; 210/150, 151, 615, 619; 156/196, 218

[56] References Cited

U.S. PATENT DOCUMENTS

| 3,347,381 | 10/1967 | Minch et al. | 210/150 |
|---|---|---|---|
| 3,589,518 | 6/1971 | Breboin et al. | 210/150 |
| 3,704,869 | 12/1972 | Priestley | 210/150 |
| 4,623,492 | 11/1986 | Pastorek | 210/150 |
| 4,678,567 | 7/1987 | Ueda | 210/150 |
| 5,290,435 | 3/1994 | Stilkenboom | 210/151 |
| 5,389,247 | 2/1995 | Woodside | 210/151 |
| 5,423,988 | 6/1995 | Yamasaki et al. | 210/151 |
| 5,460,722 | 10/1995 | Chen | 210/150 |
| 5,468,392 | 11/1995 | Hanson et al. | 210/150 |
| 5,580,644 | 12/1996 | Minami | 210/150 |
| 5,609,753 | 3/1997 | Prazmowski | 210/151 |

FOREIGN PATENT DOCUMENTS

| 12 43 648 | 1/1961 | Germany . |
|---|---|---|
| 40 27 126 | 8/1990 | Germany . |
| 40 32 234 | 10/1990 | Germany . |

OTHER PUBLICATIONS

Klimeck, R. et al., "Absorber Packed With Orientated Helices", Brit. Chem. Eng. & Proc. Tech., 16, 11, p. 1018 (Nov. 1971).

*Primary Examiner*—W. L. Walker
*Attorney, Agent, or Firm*—Deveau, Colton & Marquis

[57] ABSTRACT

Tower packing blocks (10) for biological treatment particularly of waste water, comprising a bundle of tube sections (11) with net-like structured peripheral surfaces. The tube sections (11) are connected together at their end sides (20) by reflector welding. Thus there are formed at the end sides (20) of the tube sections (11) accumulations of material (21) which constrict the free internal cross-section of the tube sections (11). These constrictions render difficult the passage of water to be treated through the tower packing block (10). Thus the effectiveness of such known tower packing blocks (10) is reduced. According to the invention, the accumulations of material (21) at the end sides (20) of the tube sections (11) are of such dimensions, i.e. reduced in width, that they correspond to the cross-sections of the tube sections (11) outwith the accumulations of material (21), and thus the cross-sectional constrictions present in known tower packing blocks (10) are eliminated. Such a tower packing block (10) is produced in that, after reflector welding, the width of the accumulations of material (21) is reduced to such an extent that they are approximately flush with the internal and external walls of the tube sections (11).

23 Claims, 3 Drawing Sheets

TOWER PACKING BLOCK AND METHOD FOR MANUFACTURING THE SAME

DESCRIPTION

The invention relates to a tower packing block according to the preamble to claims 1 and 2, and to a method for manufacturing a tower packing block according to the preamble to claim 6.

The tower packing blocks involved here are used to form trickle filters, immersion trickle filters or submerged solid beds for biological treatment of waste water or other fluids (liquids or gases). For this purpose the tower packing blocks are occupied by a biomass, a so-called filter film.

A method is known of interconnecting a plurality of adjacent tube sections with a net-like jacket structure in order to form tower packing blocks. The tube sections are connected by means of reflector welding, at least the end faces of the tube sections on one side of the tower packing block being heated and pressurised. There result on the end faces of the tube sections accumulations of material which melt at the contact points with end faces of adjacent tube sections, and in this way form points of connection.

Welding of the end faces of the tube sections undertaken in known tower packing blocks leads to a situation in which the accumulations of material, similar to weld seams, are wider than the thickness of the jacket walls of the tube sections outwith the area of the accumulations of material, so that the free internal cross-sections of the tube sections and the cross-sections of the free spaces located between adjacent tube sections (so-called diamonds) are reduced. The result is a reduction in the free spaces at the ends in the tube sections and between adjacent tube sections. This renders difficult a longitudinally-directed flow through the tower packing blocks, and the throughput of fluid per time unit is reduced. This leads to a reduction in the efficiency of such known tower packing blocks.

The object underlying the invention is to provide an efficient tower packing block and a simple method of manufacturing the same.

A tower packing block serving to achieve this object has the features of claim 1. Accordingly, the accumulations of material forming the weld seams at at least one end face of the tower packing block are so formed that they connect at least approximately flush with the internal diameter of the tube sections in their non-deformed areas outwith the accumulations of material. A reduction of the cross-section of the internal tube spaces enclosed by the peripheral surfaces of the tube sections, as effected in known tower packing blocks, is accordingly not present in the tower packing block according to the invention.

A further tower packing for achieving the object underlying the invention has the features of claim 2. Accordingly, the end-face cross-section of the tower block in the region of the accumulations of material serving as a weld connection for the tube sections approximately corresponds to the cross-section of the tower packing block in the unwelded areas of the tube sections following the accumulations of material. This also ensures that the accumulations of material serving as a weld connection for adjacent tube sections involve no appreciable reduction in the free spaces of the tower packing block serving as flow paths for the fluid to be treated.

The accumulations of material are also preferably formed to be flush with the outer peripheral surfaces of the tube sections in the gusset-like intermediate spaces between adjacent tube sections. In this way the cross-section of the tower packing units is not, or at least not appreciably, altered by the accumulations of material forming the weld connections between the tube sections. The accumulations of material serving as a weld connection between the tube sections therefore do not impede the passage of the fluid for treatment through the tower packing blocks, and therefore impair the efficiency of the same.

A method of achieving the purpose underlying the invention includes the measures of claim 6. By means of the reduction in the width of the accumulations of material similar to weld seams, the constrictions in cross-section arising during the foregoing welding at at least one end face, preferably however at both end faces of the tower packing block, are cancelled. This is effected in a still warm or heated condition of the accumulations of material by plastic deformation, whereby the material deformations which have not yet hardened are reshaped by the heat of the welding, without additional heating.

A reduction in the width of the accumulations of material is preferably effected by a calibration effected at the end. This calibration leads to a widening of the internal cross-section of the tube sections or of the gusset-like free spaces between adjacent tube sections.

Further sub-claims relate to preferred further developments of the tower packing block according to the invention and of the method for manufacturing the same.

Figure 2:
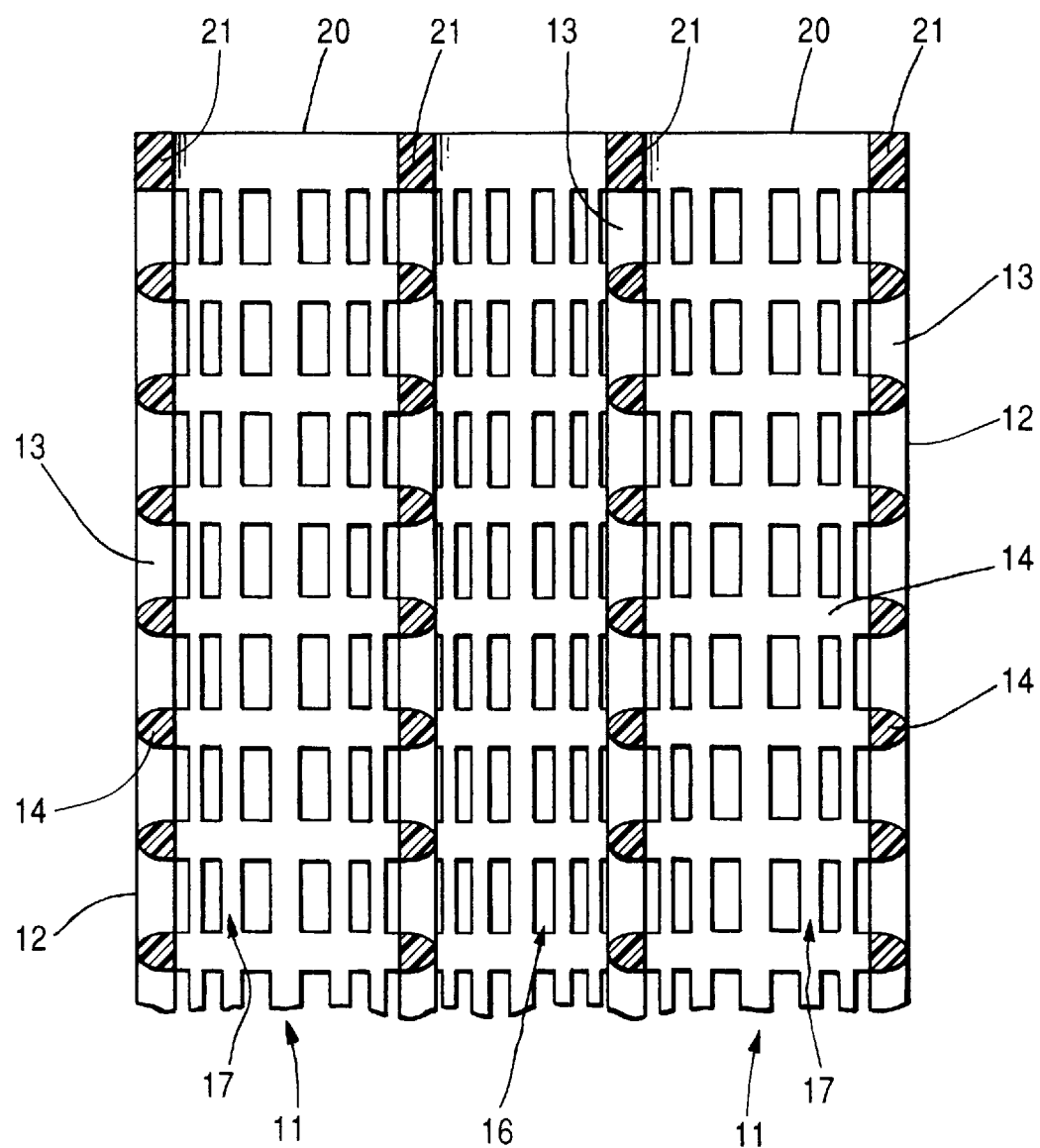
Figure 3:
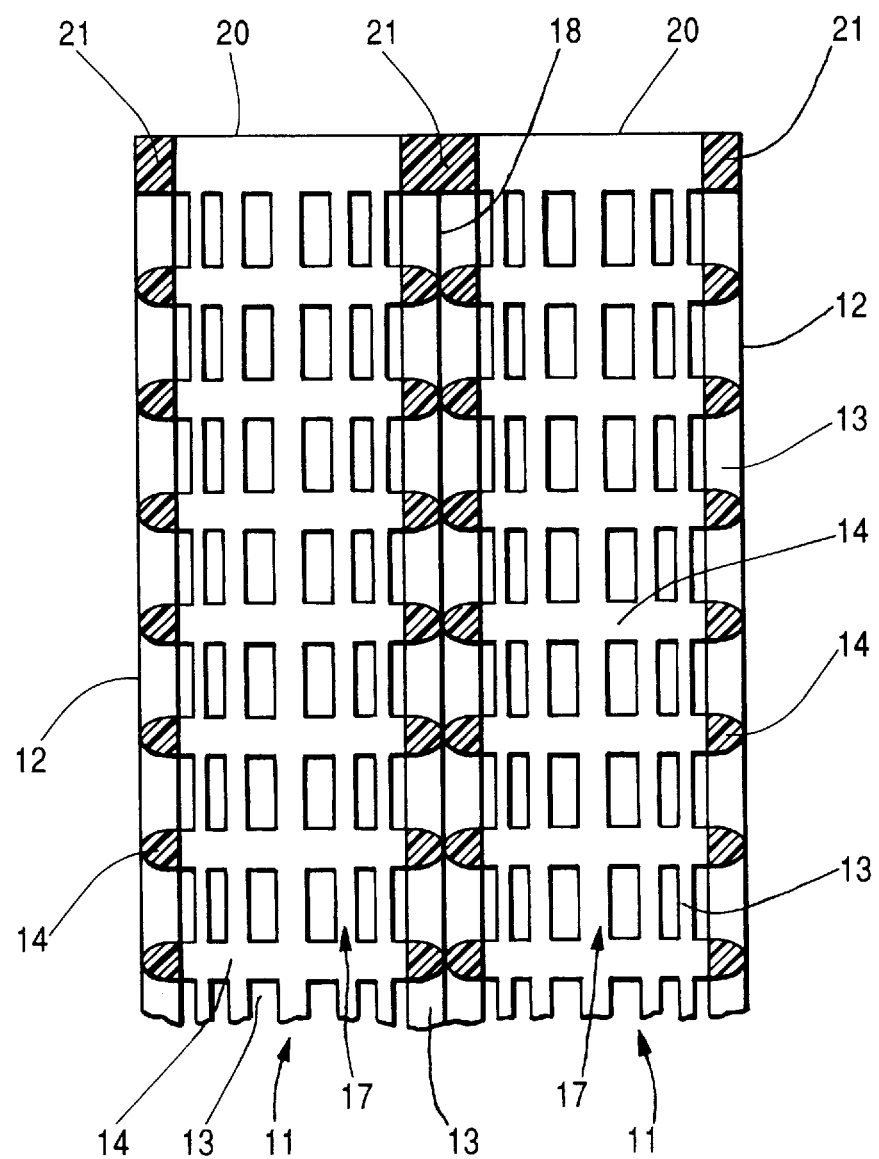

Preferred embodiments of the invention, given by way of example, will be explained in more detail in the following with reference to the drawing, which shows:

FIG. 1: a perspective and diagrammatic view of a tower packing block;

FIG. 2: a cross-section II—II on a larger scale through a portion of the tower packing block in FIG. 1, and FIG. 3: a cross-section III—III on an enlarged scale through two tube sections of the tower packing block.

A tower packing block 10, as shown in FIG. 1, serves in particular for biological treatment of fluids, preferably waste water. One or also a plurality of tower packing blocks 10, occupied by a filter film, are disposed as a submerged solid bed or trickle filter stationarily in a fluid bath, the waste water for biological treatment located in the fluid bath being passed through the or each tower packing block 10. The tower packing blocks 10 may however also be disposed as so-called immersion trickle filters in a submerged drum reactor which, being rotarily drivable, is entirely or partly submerged in waste water located in a fluid bath, the waste water in the fluid bath flowing through the tower packing blocks, as a result of the rotary drive of the submerged drum reactor.

Each tower packing block 10 is composed of a plurality of tube sections 11 made of plastics material. In the embodiment shown the tube sections 11 are cylindrical in form with a peripheral surface 12 of a net like structure. The tube sections 11 shown in the Figures are in the form of net tubes. The net tube-like tube sections 11 are formed by longitudinal trains 13 extending at a spacing apart and parallel to one another, and by circumferential trains 14 extending at a distance from one another and parallel to one another. The longitudinal trains 13 and the circumferential trains 14 are integrally connected at their intersection points.

The tower packing block 10 has a plurality of tube sections 11 of equal length extending parallel to one another. As FIG. 1 shows, the tube sections 11 are disposed next to one another and one behind the other. A plurality of adjacent tube sections 11 form a row of tube sections 15. A plurality of these rows 15 of tube sections, having an identical number of tube sections 11, lie one behind the other. In the embodiment shown, each row 15 of tube sections consists of seven adjacent tube sections 11. In turn, seven rows 15 of tube sections are disposed one behind the other. In this way the tower packing block 10 has a square base area. It may however be imagined that the tower packing blocks 10 could be formed with any dimensions deviating from one another, the respective row 15 of tube sections having a larger or smaller number of tube sections 11, or an optional number of rows 15 of tube sections disposed one behind the other.

In the embodiment shown, the longitudinal medial axes of the tube sections 11 of adjacent rows 15 of tube sections are flush with one another so that, in the directions extending transversely to the rows 15 of tube sections, the tube sections 11, as in the rows 15 of tube sections, lie next to one another or one behind the other. By means of this relative disposition of the tube sections 11 to one another, there results between one group of respectively four adjacent tube sections 11 an intermediate space 16 with a cross-section similar to a diamond. The intermediate spaces 16 between four respective tube sections 11 extend in the longitudinal direction of the tube inner space 17 enclosed (cylindrically) by the respective peripheral surface 12 of each tube section 11.

The longitudinal medial axes of the tube inner spaces 17 and of the intermediate spaces 16 consequently extend parallel to one another.

The tube sections 11 of the tower packing block 10 abut directly on one another. Due to the cylindrical design of the tube sections 11, adjacent tube sections 11 are in contact with the outer sides of their peripheral surfaces 11 along a line of contact 18 extending parallel to the longitudinal medial axis of the respective tube section 11. The tube sections 11 are connected with one another at their end sides 20 forming oppositely-lying end faces 19 of the tower packing block 10. It is also imaginable to connect the tube sections 11 only with their end sides 20 abutting on one end face 19 of the tower packing block 10. The end side 20 of adjacent tube sections 11 are connected, as with known tower packing blocks 10, by welding. For this purpose the end sides 20 of the tube sections 11 made of plastics material are heated and pressurised, so that accumulations of material 21 result in the areas of the end sides 20 of the tube sections 21. Due to the fact that the accumulations of material 21 flow together in the areas of contacting adjacent tube sections 11, a connection of the respective tube sections 11 results.

As FIGS. 2 and 3 show, the accumulations of material 21 in the regions of the end sides 20 of the tube sections 11 are formed in a special way. The accumulations of material 21 are shaped in such a way, especially widened, that their widths approximately correspond to the wall thickness of the peripheral surface 12 of the tube sections 11. In this way the internal diameter of each accumulation of material 21 is approximately of the same size as the internal diameter of the corresponding tube section 11 outwith the region of the accumulation of material 21. In this way the tube sections 11 have, continuously over their entire length, the same or almost the same internal diameter. It is also imaginable that in the regions of the accumulations of material 21 the internal diameter of the tube sections 11 is greater than the internal diameter of the tube sections 11 outwith the accumulations of material 21. The widening of the accumulations of material 21 then extends beyond the internal diameter of the tube sections between the accumulations of material 21. The outer diameter of each accumulation of material 21 corresponds to the outer cross-section of the respective tube section 11 outwith the area of the accumulation of material 21. As a result of the measurements described above of the accumulations of material 21, the cross-sections of the intermediate spaces 16 and of the tube inner spaces 17 in the areas of the accumulations of material 21 correspond to the cross-sections of the intermediate spaces 16 and of the tube inner spaces 17 outwith the areas of the accumulations of material 21. Thus, in other words, the accumulations of material 21 are so formed that they do not, or do not appreciably constrict, the cross-sections of the tube inner spaces 17 or and of the intermediate spaces 16. FIG. 3 shows that at a point where the accumulations of material 21 of adjacent tube sections 11 are in contact, i.e. on the line of contact 18, the annular accumulations of material cohere at the end sides 20 of the tube sections 11, the plastics materials of the accumulation of material having flowed into one another and thus produced a solid connection of the accumulations of material 21 at the end faces 19 of the tower packing blocks 20, by means of which the tube sections 11 are held together, forming the tower packing block 10.

The method for manufacturing a tower packing block 10 is as follows:

Firstly a number of tube sections 11 of identical length corresponding to the desired dimensions of the tower packing block 10 is grouped in such a way that they are in the relative arrangement shown in FIG. 1, in which the tue sections 11 abut on one another with their outer peripheral surfaces 12 on the lines of contact 18 extending perpendicularly to the end faces 19 of the tower packing blocks 10. In this position the as yet unconnected tube sections 11 are temporarily secured by corresponding devices.

After the tube sections 11 have been grouped and secured in accordance with the view in FIG. 1, a heatable planar welding plate is brought into contact with the end face 19 of the tower packing block 10, the heating plate being of such dimensions that it covers the end side 20 of all tube sections 11. By means of following or permanent heating of the heating plate, the plastics material in the areas of the end sides 20 of the tube sections 11 is heated until it is in a dough-like or fluid condition. By means of the application of pressure, the heated material in the areas of the end sides 20 of the tube sections 11 is plastically deformed and compressed, so that the net-like structure of the tube sections 11 in the region of the end sides 20 is removed and accumulations of material 21 result. To this extent the procedure corresponds to the known method of reflector welding, in which the annular accumulations of material 21 of adjacent tube sections 11 flow together at their points of contact, connecting the tube sections 11, but also a constriction of the cross-sections of the intermediate spaces 16 and of the tube inner spaces 17 results. The width of the accumulations of material 21 is thus also at first greater than the wall thickness of the peripheral surface 12 of the respective tube section 11.

According to the invention, directly after the reflector welding, the resultant cross-sectional constriction of the intermediate spaces 16 and of the tube inner spaces 17 in the region of the accumulations of material 21 is cancelled. This is effected by the heat from the welding, i.e. at a point in time at which the plastics material of the accumulations of material 21 is still in a molten or dough-like condition, by a plastic deformation. This deformation is similar to a calibration, the accumulation of material 21 being brought to a width which approximately corresponds to the wall thickness of the peripheral surfaces 12 of the tube sections 11.

Deformation of the material accumulation 21 is effected by a moulding plate with projections. The projections correspond to the cross-sections of the intermediate spaces 16 and of the tue inner spaces 17 outside the accumulation of material 21. The relative disposition of the projections corresponds to the positions of the cross-sections of the tube inner spaces 17 and of the intermediate spaces 16 of the tower packing block 10. As deformation of the accumulation of material 21 is effected by using the residual heat from the welding procedure, it is not necessary to heat the projections or the moulding plate. For particular cases of application, heating of the projections and/or of the moulding plate might just as easily be undertaken.

The accumulation of material 21 is deformed by insertion of the projections from the respective end face 19 of the tower packing block 10 into the intermediate spaces 16 and the tube inner spaces 17. Due to the corresponding design of the projections to the cross-sections of the intermediate spaces 16 and of the tube inner spaces 17, there thereby occurs a displacement of the still plastically deformable material of the accumulations of material 21. In order to prevent the material from the accumulations 21 from being pushed into the intermediate spaces 16 and the tube inner spaces 17, the projections are of a slightly conical design. Their cross-section increases as they are increasingly inserted into the intermediate spaces 16 or tube inner spaces 17, until a cross-section is achieved which corresponds to that of the intermediate spaces 16 and the tube inner spaces 17. There thus occurs a gradual continuous widening of the annular accumulation of material 21 of each tube section 11, the superfluous material flowing upwards contrary to the direction of movement of the projections in such a way that, as the width of the accumulation of material decreases, the length and height of the same is increased by the amount of the displaced material.

After deformation of the accumulations of material 21 is complete, the moulding plate is lifted off the corresponding end face 19 of the tower packing block 10, and thus the projections are withdrawn from the end sides 20 of the tube sections 11. Thereafter the accumulations of material 21 have annular cross-sections which approximately correspond to the cross-section of the respective tube section 11 outside the accumulations of material 21, so that the constrictions in the cross-sections of the intermediate spaces 16 and of the tube inner spaces 17 resulting from reflector welding are entirely or at least substantially cancelled out (FIGS. 2 and 3).

If, as in the embodiment shown, oppositely-lying end faces 19 of each tower packing block 10 are provided with end sides 20 of the tube sections 11 welded together by accumulations of material 21, the reflector welding and following deformation or calibration of the resultant accumulations of material 21 are effected on both end sides 19 of the tower packing block 10 simultaneously or consecutively. It may also be imagined that the tube sections 11 could be connected together by accumulations of material 21 similar to weld seams only on one face 19 of the tower packing block, so that then calibration of the accumulation of material 21 is necessary only at this end face 19. Then the end sides 20 of the tube sections 11 remain unconnected on the oppositely-lying end face 19 of the tower packing block 10.

I claim:

1. Tower packing block for forming solid beds, trickle filters or immersion trickle filters for biological treatment of fluids, with a plurality of tube sections, said tube sections being connected together at their end sides by accumulations of material similar to weld seams, characterized in that the accumulations of material are formed on the end sides of the tube sections approximately flush at least with the inner diameter of the tube sections.

2. Tower packing block according to claim 1, characterized in that, in the regions of intermediate spaces between adjacent tube sections, the accumulations of material correspond approximately to the cross-section of the intermediate spaces defined by the external circumference of the tube sections.

3. Tower packing block according to claim 2, characterized in that the accumulations of material on the end sides of the individual tube sections are in contact with one another in the areas of contact with adjacent tube sections.

4. Tower packing block according to claim 2, characterized in that the width of the accumulations of material is approximately of the same size as the wall thickness of both peripheral surfaces of the two respectively interconnected tube sections.

5. Tower packing block according to claim 2, characterized in that the tube sections have a circular cross-section.

6. Tower packing block according to claim 1, characterized in that the accumulations of material on the end sides of the individual tube sections are in contact with one another in the areas of contact with adjacent tube sections.

7. Tower packing block according to claim 6, characterized in that the accumulations of material are in integral contact with one another.

8. Tower packing block according to claim 1, characterized in that the width of the accumulations of material is approximately of the same size as the wall thickness of both peripheral surfaces of the two respectively interconnected tube sections.

9. Tower packing block according to claim 1, characterized in that the fluid is a waste water.

10. Tower packing block according to claim 1, characterized in that the tube sections have a peripheral surface structured in a net-like configuration.

11. Tower packing block for forming solid beds, trickle filters or immersion trickle filters for biological treatment of fluids, with a plurality of tube sections, said tube sections being connected together at their end sides by accumulations of material similar to weld seams, characterized in that the accumulations of material on at least one end side of the tube sections extend substantially over only the cross-sectional surfaces of the tube sections.

12. Tower packing block according to claim 11, characterized in that, in the regions of intermediate spaces between adjacent tube sections, the accumulations of material correspond approximately to the cross-section of the intermediate spaces defined by the external circumference of the tube sections.

13. Method of manufacturing tower packing blocks with a plurality of tube sections for biological treatment of fluids, in which the tube sections are connected together at the end by heating at least one end side of each tube section and the application of pressure to the warmed end side in order to form an accumulation of material similar to a weld seam at least one end side of the tube sections, characterized in that the accumulations of material are brought by plastic deformation to a predetermined width while still in a warm condition.

14. Method according to claim 13, characterized in that a reduction in the width of the surfaces surrounded by the accumulations of material is effected.

15. Method according to claim 14, characterized in that the surfaces are inner cross-sectional surfaces of the tube sections.

16. Method according to claim 14, characterized in that the surfaces are intermediate spaces between tube sections.

17. Method according to claim 13, characterized in that deformation of the accumulations of material is undertaken with at least one moulding tool.

18. Method according to claim 17, characterized in that the deformation tool has projections which are inserted from the respective end face of the tower packing block into the tube inner spaces of the tube sections and/or intermediate spaces between adjacent tube sections.

19. Method according to claim 18, characterized in that the projections of the or of each moulding tool are inserted immediately after production of the accumulations of material into the tube inner spaces and/or intermediate spaces.

20. Method according to claim 13, characterized in that the reduction in the width of the accumulations of material is effected gradually and/or continuously.

21. Method according to claim 13, characterized in that the reduction in width of the accumulations of material effected by plastic deformation is effected when the material or the accumulations of material is still in a flowable or dough-like condition.

22. Method according to claim 13, characterized in that widening of the surfaces enclosed by the accumulations of material is effected by calibration.

23. Method according to claim 13, characterized in that the tube sections have a peripheral surface structured in a net-line configuration having cross-sections and the accumulations of material are deformed in such a way that they extend only approximately over the region of the cross-sections of the net-like structured peripheral surfaces of the tube sections.

* * * * *